April 14, 1925.
H. R. VAN DEVENTER
COMBINATION ELECTRIC BATTERY AND CONDENSER
Filed June 14, 1923
1,533,525
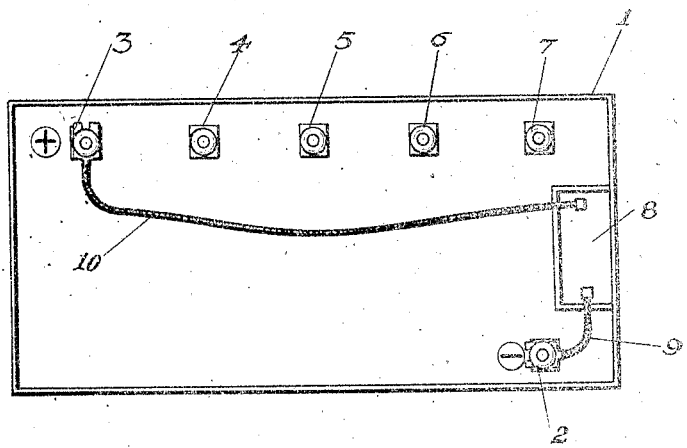
Fig. 1.
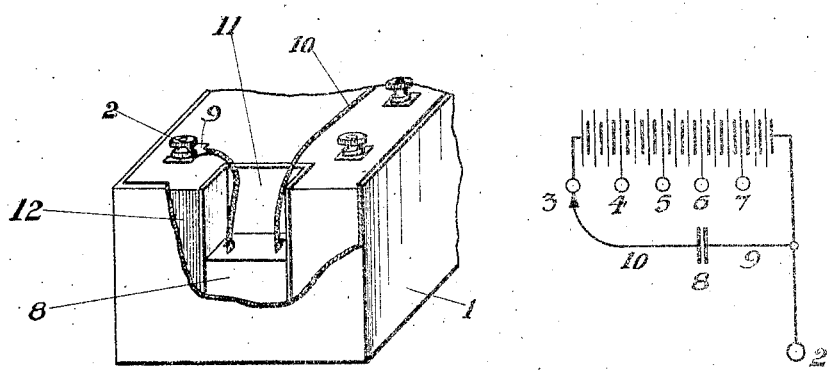
Fig. 2.
Fig. 3.
Inventor
Harry R. Van Deventer Patented Apr. 14, 1925.

1,533,525

UNITED STATES PATENT OFFICE.

HARRY R. VAN DEVENTER, OF NEW YORK, N. Y., ASSIGNOR TO DUBILIER CONDENSER AND RADIO CORPORATION, A CORPORATION OF DELAWARE.

COMBINATION ELECTRIC BATTERY AND CONDENSER.

Application filed June 14, 1923. Serial No. 645,314.

*To all whom it may concern:*

Be it known that I, HARRY R. VAN DEVENTER, a citizen of the United States, residing at New York city, in the county of New York and State of N. Y., have invented certain new and useful Improvements in Combination Electric Batteries and Condensers, of which the following is a specification.

My invention relates to an electric battery and condenser such as is commonly used in connection with radio receiving sets.

When radio receiving sets are equipped with vacuum tubes, it is customary to employ a battery of small dry cells commonly known as a "B" battery. It often occurs that these batteries are or after use become noisy, and it has been found that by bridging a condenser across the plurality of cells comprising the battery unit, that the noises will be wholly or partly eliminated.

The object of my invention is to provide a combination unit wherein the condenser is combined with a plurality of battery cells to form a unitary structure.

A further object is to provide a unitary structure comprising battery cells and a unit condenser in which the condenser can be readily removed and replaced.

Another object is to provide a unitary structure comprising a plurality of battery cells and a condenser, the latter having a terminal adapted to be placed in contact with the terminals of a plurality of the cells.

Figure 1 is a view looking down upon a unitary structure embodying my invention. Figure 2 is a view of the unitary structure having the end broken away to show how the condensers may be positioned therein. Figure 3 is a circuit diagram of the combination of battery cells and condenser.

For the sake of illustration, I will describe my invention as arranged for an ordinary "B" battery commonly used in connection with radio receiving sets. Such a battery commonly consists of a plurality of small dry cells usually connected in series, placed within a suitable container, the outer casing of which I have designated by the numeral 1. As the construction and arrangement of the dry cells are well known and may be varied with wide limits, I do not show or describe the same, it being sufficient to state that the dry cells are suitably arranged within the container 1 and electrically connected in any desired manner, it being understood that the container 1 is filled with wax or other compound from which projects the negative terminal 2 and, usually, a plurality of positive terminals 3, 4, 5, 6 and 7 whereby various voltages can be taken off.

Housed in the casing 1 with the dry cells so as to form a unitary structure, I provide a suitable condenser indicated by the numeral 8. This condenser may be of any suitable form and construction, and, as many types are known, I do not describe the same in detail.

The condenser may be positioned within the casing 1 by imbedding it in the wax or other compound 12 which surrounds and secures the dry cells in place. The condenser is provided with two terminal leads 9 and 10. The lead 9 may be permanently connected to the terminal 2 (underneath the wax) or it may be removably connected thereto. The terminal 10 is brought out above the wax and left long enough to connect to any one of the positive terminals 3, 4, 5, 6 or 7.

In Figure 2, I have shown that the casing may be provided with a well 11 in which the condenser 8 may be placed. This well may be left open at the top, or the top can be closed by a piece of fibre or the like, or it may be filled with wax. When the battery is exhausted, the cardboard cover or wax may be taken out of 11 and the condenser removed, and the rest of the unit thrown away.

It will be observed that the battery cells and the container 1 form no part of the condenser structure. This enables the condenser to be manufactured and tested complete and then assembled with the battery cells to form the complete unit as described, my invention consisting of the unit structure whereby the battery cells and the condenser may be merchandized as a unit.

I claim:

1. A unit structure comprising a plurality of battery cells, a casing therefor, and a condenser within said casing adapted to be connected to said battery cells.

2. A unit structure comprising a plurality of battery cells, a casing for said cells, a filling surrounding said cells, and a condenser within said filling, and a lead connected to said condenser and projecting from the filling and adapted to be electrically connected to said cells.

3. A unit structure comprising a plurality of battery cells, a casing for said cells, a filling surrounding said cells, having an aperture therein, and a condenser removably positioned in said aperture and adapted to be electrically connected to said cells.

4. A unit structure comprising a plurality of battery cells, a casing surrounding said cells, a filling compound surrounding said cells within the casing, a plurality of terminals electrically connected to said cells projecting above said filling compound, a condenser positioned within the casing, terminal leads connected to the condenser and adapted to be electrically connected to said terminals.

5. A battery unit comprising a container, a plurality of battery cells therein connected in series with each other, and a condenser in said container and connected to form a radio frequency current by-pass.

In testimony whereof I affix my signature.

HARRY R. VAN DEVENTER